US012742427B1

(12) United States Patent
Ivanov et al.

(10) Patent No.: US 12,742,427 B1
(45) Date of Patent: Sep. 22, 2026

(54) VARIED INTAKE VALVE OPERATION FOR IMPROVED TRANSIENT RESPONSE IN GASEOUS FUEL ENGINE

(71) Applicant: Caterpillar Inc., Peoria, IL (US)

(72) Inventors: Radoslav Boychov Ivanov, Dupnitsa (BG); Robert McDavid, Dunlap, IL (US); Chad Palmer Koci, Washington, IL (US); Bobby John, Peoria, IL (US); Jonathan W. Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/082,276

(22) Filed: Mar. 18, 2025

(51) Int. Cl.
*F02D 13/02* (2006.01)
*F02B 43/12* (2006.01)
*F02D 41/00* (2006.01)

(52) U.S. Cl.
CPC .......... *F02D 13/0203* (2013.01); *F02B 43/12* (2013.01); *F02D 2041/001* (2013.01)

(58) Field of Classification Search
CPC ............. F02D 13/0203; F02D 13/0215; F02D 13/0207; F02D 13/0219; F02D 13/0253; F02D 13/0234; F02D 13/0238; F02D 13/02; F02D 13/002; F02D 43/12; F02D 2041/001; Y02T 10/12; Y02T 10/40
See application file for complete search history.

(56) References Cited

U.S. PATENT DOCUMENTS

| | | | | |
|---|---|---|---|---|
| 7,117,830 B1 * | 10/2006 | Boyer | F02D 19/022 | 123/295 |
| 7,487,750 B2 | 2/2009 | Leone et al. | | |
| 7,690,336 B2 * | 4/2010 | Bowman | F02D 41/0025 | 123/48 R |
| 7,740,010 B2 | 6/2010 | Fulton et al. | | |
| 8,291,884 B2 | 10/2012 | Boyer et al. | | |
| 11,073,070 B2 * | 7/2021 | Sturman | F02D 19/061 | |
| 11,994,058 B2 | 5/2024 | Cress | | |
| 2002/0073955 A1 * | 6/2002 | Collins | F01L 9/20 | 123/198 DB |
| 2002/0166515 A1 * | 11/2002 | Ancimer | F02B 1/12 | 123/27 R |

(Continued)

FOREIGN PATENT DOCUMENTS

| | | |
|---|---|---|
| DE | 102007058554 A1 | 6/2008 |
| DE | 102019213133 A1 | 3/2021 |

(Continued)

OTHER PUBLICATIONS

Written Opinion and International Search Report for Int'l. Patent Appln. No. PCT/US2025/058881, mailed Apr. 21, 2026 (15 pgs).

*Primary Examiner* — Dapinder Singh

(57) ABSTRACT

A gaseous fuel engine system includes an engine forming a cylinder, and an intake valve movable to open and close an intake port to the cylinder. The engine system also includes a fuel system having a fuel injector to inject a gaseous fuel such as a gaseous hydrogen fuel to mix with a flow of intake air for combustion in the cylinder. The engine system further includes a cam coupled to the intake valve, and a variable valve actuator coupled to the intake valve and arranged to position the intake valve at a flow-throttling middle position to improve fuel and air mixing, such as in response to engine load transients.

20 Claims, 4 Drawing Sheets

(56) References Cited

U.S. PATENT DOCUMENTS

| | | | | |
|---|---|---|---|---|
| 2008/0167791 | A1* | 7/2008 | Fulton .................... | F02M 26/47<br>60/299 |
| 2009/0283058 | A1* | 11/2009 | Modroukas ............ | F02M 25/12<br>123/2 |
| 2016/0281615 | A1 | 9/2016 | Flynn et al. | |
| 2024/0011446 | A1 | 1/2024 | Tanaka et al. | |

FOREIGN PATENT DOCUMENTS

| | | | |
|---|---|---|---|
| JP | 2009057958 | A | 3/2009 |
| WO | 2011150487 | A1 | 12/2011 |
| WO | 2017158676 | A1 | 9/2017 |
| WO | 2021005344 | A1 | 1/2021 |

* cited by examiner

VARIED INTAKE VALVE OPERATION FOR IMPROVED TRANSIENT RESPONSE IN GASEOUS FUEL ENGINE

STATEMENT OF GOVERNMENT INTEREST

This invention was made with government support under contract DE-EE0010606 awarded by the DOE. The Government has certain rights in this invention.

TECHNICAL FIELD

The present disclosure relates generally to operating a gaseous fuel engine system, and more particularly to varying a position of an intake valve from a cam-dependent position so as to promote mixing of a gaseous fuel and air.

BACKGROUND

Internal combustion engines are well known and widely used throughout the world for a broad range of purposes including powering machinery, pumps, compressors, and electrical generators to name a few examples. In a typical scenario a controlled combustion of a fuel and air occurs in a cylinder to drive a piston coupled to a rotatable crankshaft operating a load. Engines are typically designed to operate on one type of fuel, such as a liquid hydrocarbon fuel or a gaseous hydrocarbon fuel, or combinations of these in so-called dual fuel engine systems. In recent years, increased attention has been given to reduction of certain undesired emissions relative to conventional liquid fuel and gaseous fuel engines.

Gaseous molecular hydrogen and various blends of gaseous molecular hydrogen and other gaseous fuels have shown great promise in reduced engine emissions. Various new challenges have nevertheless been recognized respecting operating engines on hydrogen. Hydrogen tends to have a very fast flame speed and is quite easy to ignite, sometimes resulting in undesired patterns of combustion in the engine cylinders. Thus, many engineering efforts have focused on improving controllability and predictability of the hydrogen combustion process. It has also been observed that improved mixing of hydrogen and air for combustion can be leveraged to enable ignition at a desired engine timing and progress of the combustion process in a desired and predictable manner. One known engine system apparently capable of operating on hydrogen is known from U.S. Pat. No. 11,994,058B2 to Cress. While the strategy disclosed in the ’058 patent may have applications, the art provides ample room for improvements and development of alternative strategies.

SUMMARY

In one aspect, a method of operating an engine system includes moving a piston between a top-dead-center position and a bottom-dead-center position in a cylinder in an engine, and opening an intake valve to feed a flow of intake air from an intake port of the engine into the cylinder. The method further includes admitting a gaseous fuel containing hydrogen into the cylinder, and varying a position of the intake valve from a cam-dependent position during an intake stroke of the piston. The method further includes combusting the gaseous fuel and the intake air in the cylinder.

In another aspect, an engine system includes an engine having an engine housing forming a cylinder, an intake port arranged to feed a flow of intake air to the cylinder, an intake valve movable to open and close the intake port, and a piston movable in the cylinder. The engine system further includes a fuel system having a gaseous fuel supply, and a fuel injector fluidly connected to the gaseous fuel supply and arranged to inject a gaseous fuel to mix with the flow of intake air for combustion in the cylinder. The engine system further includes a cam coupled to the intake valve and rotatable to move the intake valve between a closed position and an open position. The engine still further includes a variable valve actuator coupled to the intake valve, and a control device structured to operate the variable valve actuator and to position the intake valve at a flow-throttling middle position between the closed position and the open position.

In still another aspect, a method of operating an engine system includes positioning an intake valve at a fully open position in an engine, and admitting a flow of intake air past the fully open intake valve into a cylinder in the engine. The method further includes combusting a gaseous fuel mixed with the intake air admitted past the fully open intake valve in the cylinder in a first engine cycle. The method still further includes positioning the intake valve at a partly open position, admitting a throttled flow of intake air past the partly open intake valve into the cylinder, and moving the intake valve from the partly open position to a closed position. The method still further includes combusting the gaseous fuel with the intake air admitted past the partly open intake valve in a second engine cycle.

DETAILED DESCRIPTION

Figure 1:
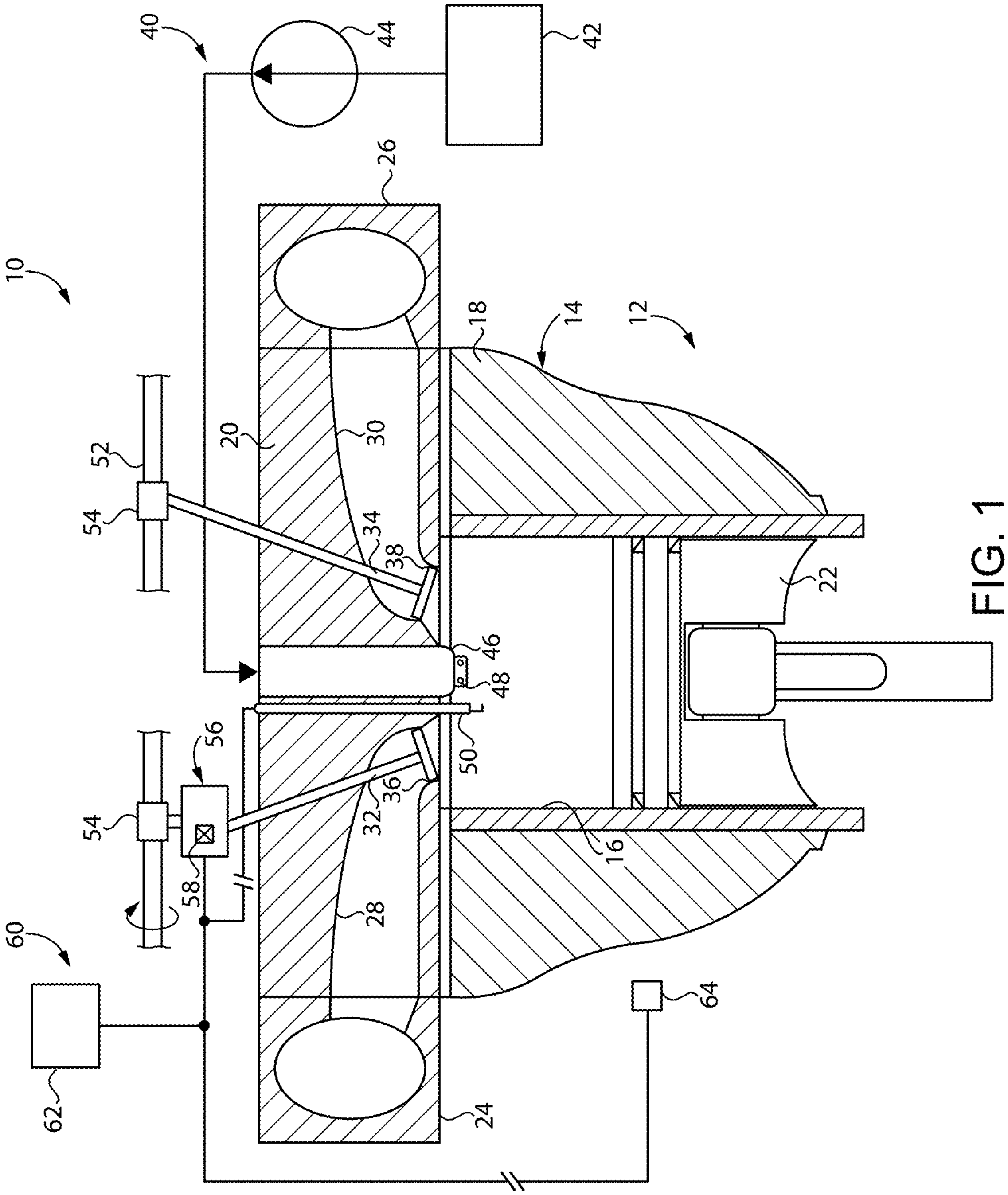
FIG. 1 is a diagrammatic view of an internal combustion engine system, according to one embodiment.

Referring to FIG. 1, there is shown a gaseous fuel internal combustion engine system 10, according to one embodiment. Engine system 10 includes an internal combustion engine 12 having an engine housing 14 forming a cylinder 16 in a cylinder block 18. A cylinder head 20 is attached to cylinder block 18. In some embodiments, cylinder head 20 may be a so-called pent roof cylinder head as illustrated, as opposed to a flat cylinder head, although the present disclosure is not thereby limited. Cylinder 16 may be one of any number of cylinders in engine 12, arranged in any suitable arrangement such as an inline pattern, a V-pattern, or still another. Engine system 10 can be used for any purpose including operating a driveline in a land vehicle or a marine vessel, operating a pump, a compressor, or an electrical generator to name a few examples. A piston 22 is positioned at least partially in cylinder 16, and movable in a generally conventional manner between a top-dead-center position and a bottom-dead-center position to rotate a crankshaft, typically in a four-stroke engine cycle.

Engine 12 further includes an intake manifold 24 and an exhaust manifold 26 coupled to cylinder head 20. An intake port 28 and an exhaust port 40 are formed in cylinder head 20. Intake port 28 connects to cylinder 16 by way of an intake opening 36. Exhaust port 30 connects to cylinder 16 by way of an exhaust opening 38. Intake port 28 is arranged to feed a flow of intake air to cylinder 16, typically a flow of pressurized intake air from a compressor in a turbocharger. Exhaust port 30 is arranged to feed a flow of exhaust from cylinder 16, typically to a turbine in a turbo charger. Engine 12 also includes an intake valve 32 movable to open and close intake port 28, and an exhaust valve 34 movable to open and close exhaust port 30.

Engine system 10 also includes a fuel system 40. Fuel system 40 includes a gaseous fuel supply 42. Gaseous fuel supply 42 may contain or otherwise supply a gaseous fuel such as a gaseous fuel containing hydrogen. In an implementation, gaseous fuel supply 42 contains gaseous molecule hydrogen. Other gaseous hydrogen fuels as contemplated herein might include a blend of at least predominantly gaseous molecular hydrogen by volume and another gaseous fuel such as methane, ethane, or natural gas. A fuel blend at a desired blend ratio of gaseous molecular hydrogen and natural gas, for example, could be produced in gaseous fuel supply 42. Gaseous fuel supply 42 could also include so-called line gas carrying a continuous supply of the gaseous fuel to be provided to engine 12. Fuel system 42 also includes at least one pump 44 operable to supply the gaseous fuel at a desired injection pressure to engine 12. In some embodiments, the gaseous fuel could be pressurized, or further pressurized, just prior to injection, such as in a fuel injector. Also in the illustrated embodiment fuel system 40 includes a fuel injector 46. Additional cylinders in engine 12 may be analogously equipped with a fuel injector.

Fuel injector 46 may include a direct fuel injector extending into cylinder 16 and having at least one gaseous fuel outlet 48 fluidly connected to cylinder 16. Fuel injector 46 might include a total of one gaseous outlet, or a plurality of gaseous fuel outlets. Fuel injector 46 will also typically include appropriate internal components for controlling an injection timing and potentially a manner, such as an injection rate, of direct fuel injection. In still other embodiments, engine 12 may be port-injected, including one or more fuel injectors arranged to inject gaseous fuel into intake port 28, manifold injectors, or still another fuel delivery strategy such as a combination of direct injection and port injection. Engine 12 may be spark-ignited and includes a spark plug 50 forming a spark gap in cylinder 16.

Engine system 10 further includes a camshaft 52 rotatable typically by way of a geartrain of engine 12 and coupled to intake valve 32 and to exhaust valve 34. In the illustrated embodiment camshaft 52 includes a plurality of cams or cam lobes 54. Cam lobes 54 can rotate in contact with intake valve 32 and with exhaust valve 34, or in contact with apparatus intervening between cam lobes 54 and the respective intake valve 32 and exhaust valve 34. Rotation of camshaft 52 moves intake valve 32 and exhaust valve 34 between respective closed positions and open positions. It will be appreciated that due to the mechanical coupling between intake valve 32 and camshaft 52, intake valve 32 will move during engine operation between cam-dependent positions at appropriate engine crank angle timings to enable an incoming flow of intake air to enter cylinder 16. Cam-dependent positions include a closed position and a fully open position assumed by intake valve 32 at engine timings dependent upon a profile of the respective cam lobe 54 that rotates in contact with intake valve 32, as further discussed herein. Exhaust valve 34 may be operated analogously.

Engine system 10 may further include a variable valve actuator 56 coupled to intake valve 32 and structured to control a position of intake valve 32 independently, or at least partially independently, of rotation and angular orientation of camshaft 52. To this end, variable valve actuator 56 may include an electrically actuated hydraulic valve 58 that can adjust a position of intake valve 32 independently of an angular orientation of camshaft 52. As noted above, intake valve 32 may include a cam-dependent closed position, approximately as shown in FIG. 1, and a cam-dependent fully open position. Variable valve actuator 56 is operable to position intake valve 32 at any of a plurality of positions between the closed position and the fully open position, including a partly open flow-throttling middle position as further discussed herein. Variable valve actuator 56 can be operated by way of any suitable strategy, including electrical actuation, hydraulic actuation, pneumatic operation, pilot-operated hydraulic actuation, electro-hydraulic operation and combinations of these. Hydraulic valve 58 can be solenoid operated, for example.

Engine system 10 also includes a control system 60. Control system 60 includes a control device 62, including any suitable electronic control unit such as a microprocessor having a central processing unit and a computer readable memory. Control device 62 may be structured to operate variable valve actuator 56 and to position intake valve 32 at the partly open flow-throttling middle position between the closed position and the fully open position.

In an embodiment, control device 62 is structured to position intake valve 32 at the middle position based upon satisfaction of an engine load criterion. Control system 60 may include at least one sensor 64 structured to monitor a parameter indicative of a present engine load level, or a requested engine load level. As engine load cannot be sensed directly, outputs of sensor 64 may be considered in combination with other factors known together as giving an indication of engine load level according to known techniques. Sensor 64 could also be a sensor coupled with an accelerator pedal, for example, an engine speed sensor, an air mass flow sensor, or still another. Sensor 64 might also include a sensor that monitors an electrical load demand of an electrical generator operated by engine system 10, that in turn can be taken as an indication of or associated with a requested engine output power demand. Those skilled in the art will appreciate various strategies for determining a requested engine load level and/or a present engine load level, including virtual sensors. In one practical implementation, the engine load criterion serving as the basis for positioning intake valve 32 at the flow-throttling middle position includes a transient load step criterion. Put differently, satisfying an engine load criterion means a condition is determined to exist, or is expected, relating to a step up or a step down in engine load that engine system 10 must respond to. Control device 62 may be structured to determine a transitory, or potentially continuing, increase or decrease in engine load level that is to be satisfied by engine system 10. Intake valve 32 may be used to throttle a flow of incoming intake air in response to a transient load step, as further discussed herein.

Figure 2:
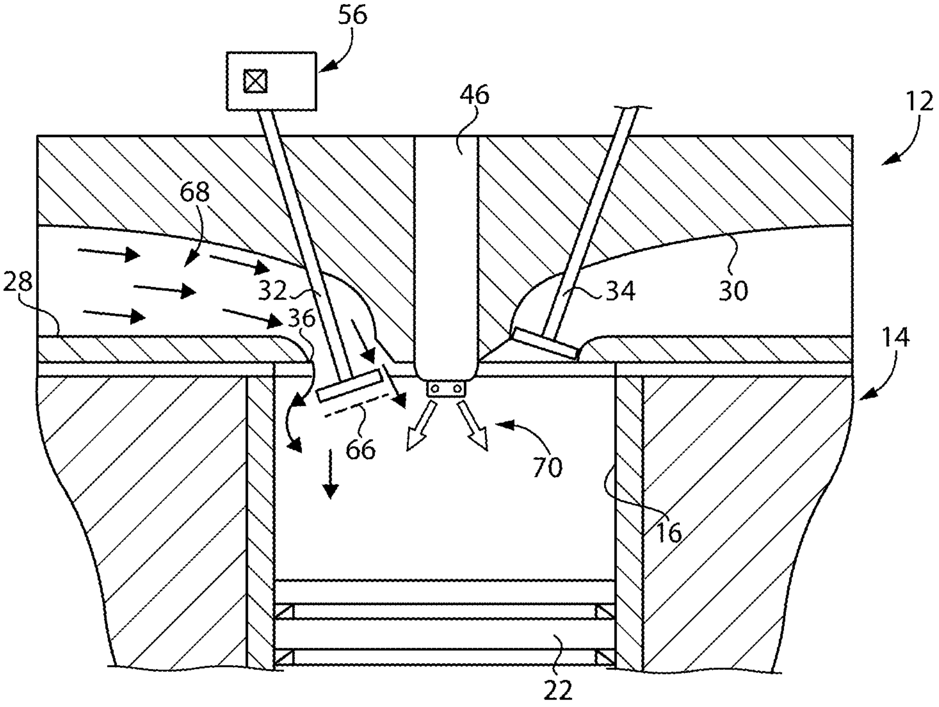
FIG. 2 is a diagrammatic view of portions of an engine system as in FIG. 1.

Referring also now to FIG. 2, there is shown engine system 10 including engine 14 wherein intake valve 32 is shown approximately as it might appear positioned at the flow-throttling middle position. Numeral 166 illustrates approximately where engine valve 32 might be positioned at the cam-dependent fully open position. Also in FIG. 2, injected gaseous fuel is shown at 70, and incoming pressurized intake air is shown at 68. It will be appreciated that selectively poisoning intake valve 32 approximately as illustrated throttles the flow of incoming intake air in a manner that accelerates the incoming intake air relative to what might be observed where intake valve 32 is fully open.

As discussed above, it can be desirable to promote mixing of gaseous fuel and air in a cylinder to ensure reliable and predictable ignition timing and combustion characteristics such as combustion phasing. It has been discovered that the throttled flow of incoming intake air can enter cylinder 16 at a relatively higher velocity than would otherwise be observed with intake valve 32 fully open, and thereby promote mixing. Increasing a velocity of the incoming intake air might be used to promote mixing such as when a transient increase in engine load is to occur. It is also contemplated that operation of engine system 10 in this manner may be advantageous at part load conditions. When engine system 10 is operated at a relatively high load such as at a rated load, the incoming intake air may have a sufficiently high velocity and mass flow that augmentation of fuel and air mixing is not needed. In such circumstances, intake valve 32 can be operated based upon angular orientation of camshaft 52, thus moved dependent upon contact with cam lobe 54 to the fully open position during an intake stroke of piston 22, for example. Those skilled in the art will envision various extensions and alternatives to those described, such as varying positioning of intake valve 32 from cam-dependent positions when a transient decrease in engine load demand is detected.

Figure 3:
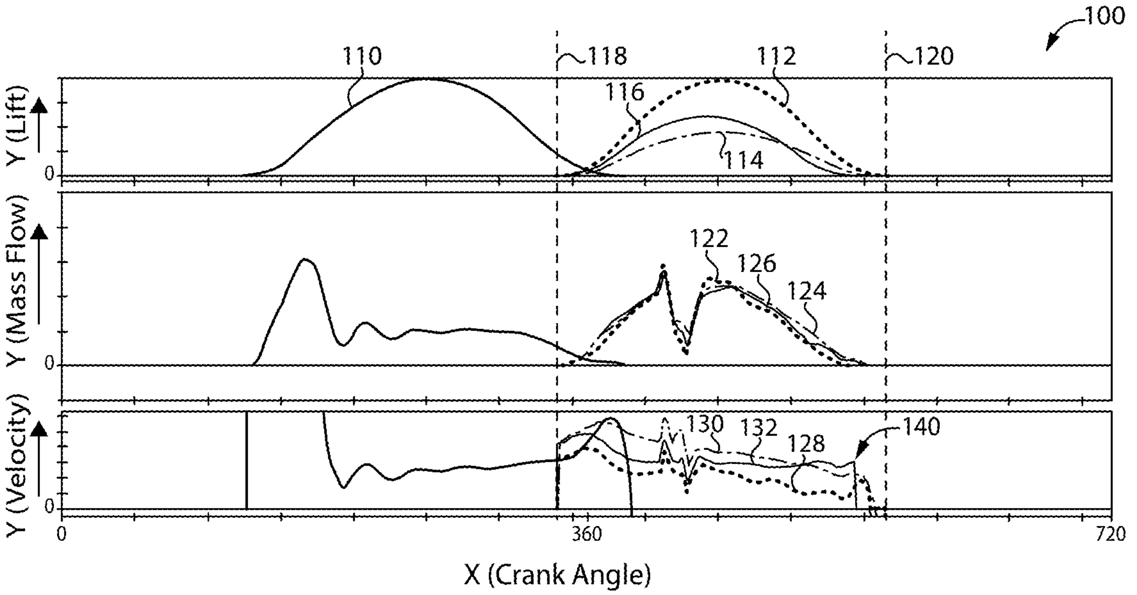
FIG. 3 is a graph showing engine events comparing aspects of the present disclosure to another strategy.

Referring also now to FIG. 3, there are shown engine events according to the present disclosure in a graph 100 in comparison to engine events and conditions that might be observed in another strategy. In FIG. 3, numeral 110 shows valve lift of an exhaust valve opening and closing in an exhaust stroke. Numeral 118 shows an intake valve opening timing. Numeral 120 shows an intake valve closing timing. Numeral 112 illustrates intake valve lift that might be observed in an engine employing throttle control of fuel air ratio, for example, via a throttle positioned in an incoming flow of intake air at a location upstream of engine 12. Numeral 114 shows intake valve lift that might be observed in accordance with the present disclosure.

It can be noted that intake valve lift 114 is observably less than in the case of the throttle controlled example 112, corresponding to intake valve 32 being moved via intake valve lift 114 to the partly open position. Numeral 116 shows intake valve lift that might be observed according to the present disclosure wherein intake valve 32 is closed early, thus moving intake valve 32 to a partly open position that is relatively more open than in the case of intake valve lift 114.

Numeral 122 shows mass flow rate that might be observed in the throttle-controlled system or application. Numeral 124 shows mass flow rate that might be observed consistent with intake valve lift 114. Numeral 126 shows mass flow rate that might be observed for intake valve lift 116. Numeral 128 shows intake air flow velocity that might be observed in the throttle-controlled strategy. Numeral 130 shows flow velocity that might be observed for intake valve lift 114. Numeral 132 shows flow velocity that might be observed for intake valve lift 116. Numeral 140 shows flow velocity just prior to intake valve closing wherein it can be noted the flow velocity exhibits a relatively sharp increase and then almost instantaneously drops to zero. It can be appreciated that closing intake valve 32 prior to a cam-dependent closing timing can induce a rapid late burst of incoming airflow that may be associated with a reduction in back flow of cylinder gases into intake port 28.

Figure 5:
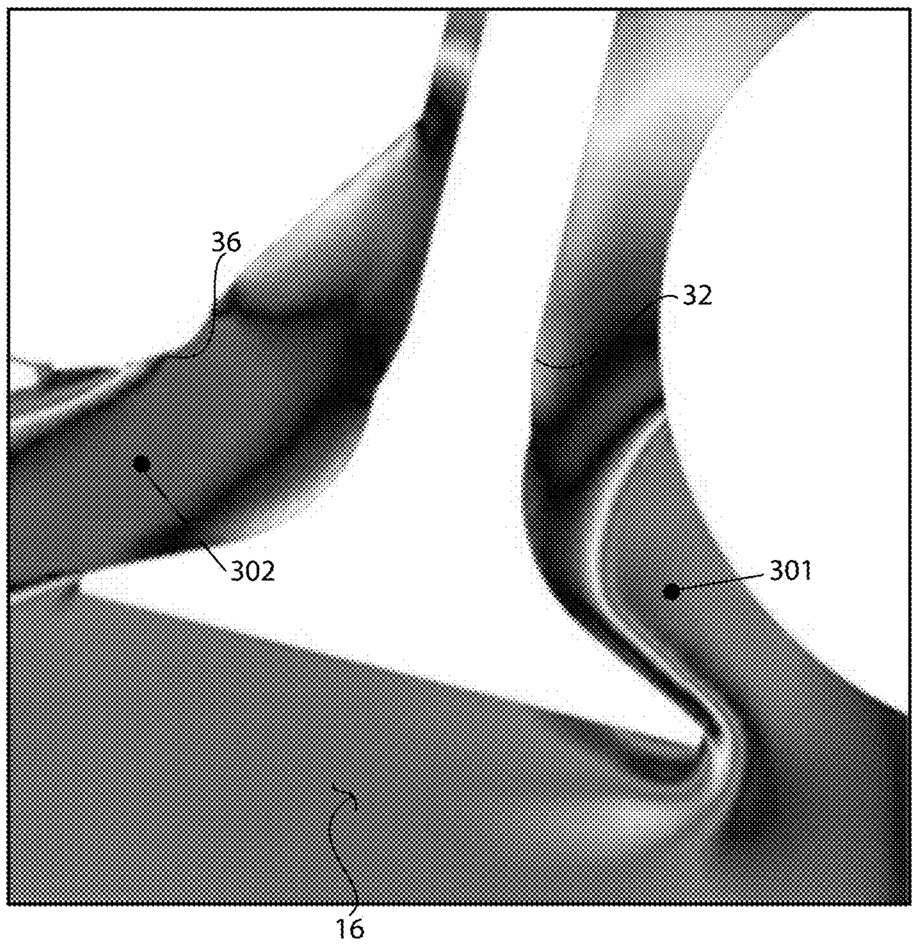
FIG. 5 is an image illustrating example flow velocities past an intake valve, according to one embodiment.

Referring also now to FIG. 5, there is a shown an illustration generally analogous to the position of intake valve 32 in FIG. 2. FIG. 5 shows intake valve 32 as it might appear at a partly open position away from intake opening 36. Numeral 301 shows relatively lesser flow velocity at locations where relatively little intake air is entering cylinder 16. Numeral 302 shows a greater flow velocity that may be directed in engine 12 more or less in a direction of injected gaseous fuel toward the center of cylinder 16. The rush of incoming intake air at the greater flow velocity can be expected to interact with and robustly mix with the injected gaseous fuel.

INDUSTRIAL APPLICABILITY

Figure 4:
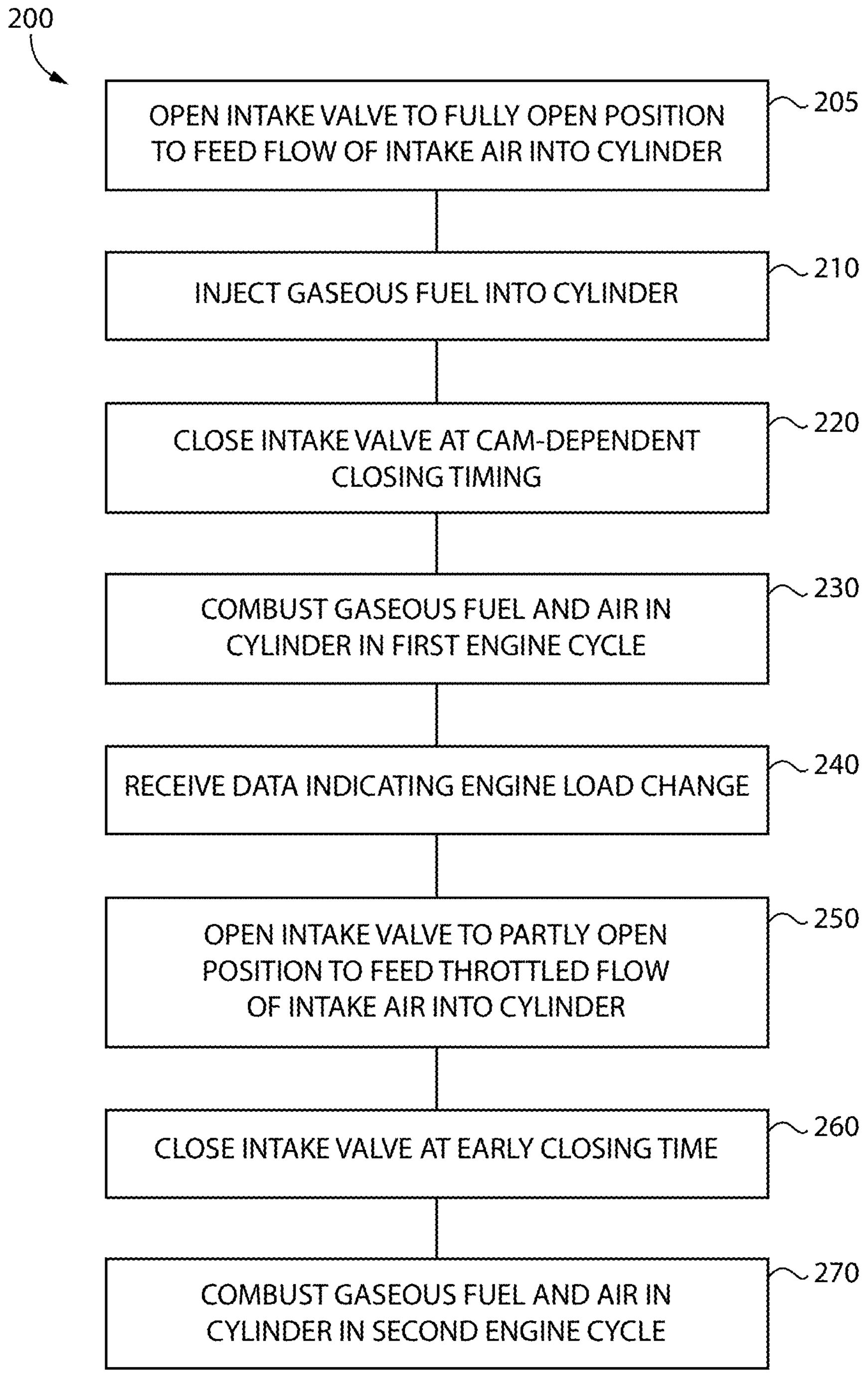
FIG. 4 is a flowchart illustrating example methodology and logic flow, according to one embodiment.

Referring to the drawings generally, but also now to FIG. 4, there is shown a flowchart 200 illustrating example methodology and logic flow, according to one embodiment. Flow chart 200 includes a block 205 wherein intake valve 32 is opened, from its closed position to its fully open position, to feed a flow of intake air into cylinder 16. Block 205 may occur during an intake stroke of piston 22 in a first engine cycle. From block 205, flowchart 200 advances to a block 210 to inject gaseous fuel into cylinder 16 as discussed herein. From block 210 flowchart 200 advances to a block 220 to close intake valve 32, adjusting intake valve 32 from the cam-dependent fully open position to the closed position at a cam-dependent closing timing. From block 220 flowchart 200 advances to a block 230 to combust gaseous fuel and air in cylinder 16 in the first engine cycle.

From block 230 flowchart 200 advances to a block 240 to receive data indicating an engine load change. As discussed herein the data indicating the engine load change might include data based on an electrical load demand of an electrical generator operated by way of engine system 10, for example. From block 240 flowchart 200 advances to a block 250 to open intake valve 32 from its closed position to its partly open position to feed a throttled flow of intake air into cylinder 16 during an intake stroke of piston 22 in a second engine cycle. From block 250 flowchart 200 advances to a block 260 to close intake valve 32 at an early closing timing, meaning a timing earlier than would otherwise be determined by an angular orientation of camshaft 52. From block 260 flowchart 200 advances to a block 270 to combust gaseous fuel and air in cylinder 16 in the second engine cycle. It should be appreciated the terms "first" and "second' in connection with engine cycles should be not be understood to mean the first engine cycle necessarily precedes the second engine cycle, nor that the first engine cycle and the second engine cycle are adjacent in time. Operation of engine system 10, and changes in operation of engine system 10 such as operation of variable valve actuator 56, may occur over the course of at least several engine cycles in responding to and accommodating engine load changes.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:

moving a piston between a top-dead-center position and a bottom-dead-center position in a cylinder in an engine;

opening an intake valve to feed a flow of intake air from an intake port of the engine into the cylinder;

admitting a gaseous fuel containing hydrogen into the cylinder;

moving the intake valve, at times, to positions dependent upon an angular orientation of a camshaft in the engine system;

varying a position of the intake valve from a cam-dependent position during an intake stroke of the piston; and combusting the gaseous fuel, and the intake air admitted via the intake valve at the position varied from the cam-dependent position, in the cylinder;

wherein the varying the position of the intake valve includes positioning the intake valve at a cam-independent position during the intake stroke of the piston.

2. The method of claim 1 wherein the admitting the gaseous fuel includes directly injecting the gaseous fuel into the cylinder.

3. The method of claim 1 wherein the gaseous fuel is at least predominantly gaseous molecular hydrogen.

4. The method of claim 1 wherein the cam-dependent position includes a fully open position.

5. The method of claim 4 wherein the varying the position of the intake valve includes positioning the intake valve at a flow-throttling middle position in an engine cycle.

6. The method of claim 5 wherein the opening the intake valve includes moving the intake valve from a closed position to the flow-throttling middle position.

7. The method of claim 6 further comprising moving the intake valve from the flow-throttling middle position back to the closed position in the engine cycle.

8. The method of claim 5 further comprising again varying the position of the intake valve relative to a cam-dependent position in the engine cycle.

9. The method of claim 8 wherein the again varying the position of the intake valve includes closing the intake valve early.

10. The method of claim 1 further comprising positioning the intake valve at a cam-dependent fully open position in another engine cycle.

11. The method of claim 1 wherein the varying the position of the intake valve includes varying the position in response to an engine load transient to vary a velocity of the flow of the intake air.

12. An engine system comprising:

an engine including an engine housing forming a cylinder, an intake port arranged to feed a flow of intake air to the cylinder, an intake valve movable to open and close the intake port, and a piston movable in the cylinder;

a fuel system including a gaseous fuel supply, and a fuel injector fluidly connected to the gaseous fuel supply and arranged to inject a gaseous fuel to mix with the flow of intake air for combustion in the cylinder;

a cam coupled to the intake valve and rotatable to move the intake valve between a closed position and a fully open position;

a variable valve actuator coupled to the intake valve; and a control device structured to operate the variable valve actuator in an engine cycle to cause the intake valve to move from the closed position to a flow-throttling middle position between the closed position and the fully open position, and to move from the flow-throttling middle position back to the closed position.

13. The engine system of claim 12 wherein the control device is further structured to position the intake valve at the flow-throttling middle position based upon satisfaction of an engine load criterion.

14. The engine system of claim 13 wherein the engine load criterion includes a transient load step criterion.

15. The engine system of claim 13 wherein the gaseous fuel supply contains a gaseous hydrogen fuel.

16. The engine system of claim 12 wherein the fuel injector includes a direct fuel injector.

17. A method of operating an engine system comprising:

positioning an intake valve at a fully open position in an engine;

admitting a flow of intake air past the fully open intake valve into a cylinder in the engine;

combusting a gaseous fuel mixed with the intake air admitted past the fully open intake valve in the cylinder in a first engine cycle;

positioning the intake valve at a partly open position;

admitting a throttled flow of intake air past the partly open intake valve into the cylinder;

moving the intake valve from the partly open position to a closed position; and combusting the gaseous fuel with the intake air admitted past the partly open intake valve in a second engine cycle.

18. The method of claim 17 wherein the gaseous fuel is directly injected and includes at least predominantly gaseous molecular hydrogen.

19. The method of claim 17 further comprising increasing a velocity of admitted intake air from the first engine cycle to the second engine cycle, and promoting mixing of the gaseous fuel and intake air based on the increased velocity.

20. The method of claim 19 further comprising reducing errors in engine load step acceptance based on the promoted mixing of the gaseous fuel and intake air.

* * * * *